(12) United States Patent
Maxwell et al.

(10) Patent No.: US 6,466,584 B1
(45) Date of Patent: Oct. 15, 2002

(54) SYSTEM AND METHOD FOR PERFORMING DIGITAL SUBSCRIBER LINE (DSL) MODEM COMMUNICATION OVER AN AC LINK BUS

(75) Inventors: Conrad A. Maxwell; David P. Braun; George C. Sneed, all of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/165,592

(22) Filed: Sep. 30, 1998

(51) Int. Cl.7 .................................................. H04J 3/22
(52) U.S. Cl. ........................ 370/465; 370/458; 375/222
(58) Field of Search ................................. 370/465, 466, 370/480, 485, 486, 487, 489, 467, 468, 458; 375/222; 710/126; 379/399.02

(56) References Cited

U.S. PATENT DOCUMENTS

| | | | | |
|---|---|---|---|---|
| 6,075,784 A | * | 6/2000 | Frankel et al. | 370/356 |
| 6,122,697 A | * | 9/2000 | Potts | 710/127 |
| 6,169,762 B1 | * | 1/2001 | Embree et al. | 375/220 |
| 6,263,075 B1 | * | 7/2001 | Fadavi-Ardekani et al. | 379/399 |
| 6,269,103 B1 | * | 7/2001 | Laturell | 370/458 |

OTHER PUBLICATIONS

Toby Jessup, DSL: The Corporate Connection, Data Communications, Feb. 1, 1998, vol. 27, No. 2, pp. 103–104, 106, 108, 110, XP000731801.

Robyn Aber, XDSL, DSL Schemes promise multi–megabit rates over local phone line–and carriers and vendors are nearly ready to deliver, Mar. 1, 1997, vol. 26, No. 3, pp. 99–100, 102, 104–105, XP000659545.

* cited by examiner

Primary Examiner—David Vincent
Assistant Examiner—Bob A Phunkulh
(74) Attorney, Agent, or Firm—Lyon & Lyon LLP

(57) ABSTRACT

A system and method for performing a digital subscriber line (DSL) transmission over an AC-link bus directly connecting a modem codec to a codec controller. The codec and codec controller connected to the AC-link bus are configured for a particular industry-defined AC-link bus protocol defining a data packet having multiple time-division multiplexed (TDM) data slots, where the present invention redefines the protocol of the AC-link bus in order to allow a high bandwidth DSL transmission to be performed using the data packets transmitted over the AC-link bus. The present invention redefines the AC-link bus protocol to provide at least one additional TDM data slot in the data packet for handling DSL modem transmission data streams. The reconfigured data packet provides additional bandwidth capabilities which allow high-bandwidth DSL modem transmissions to be sent in the data packets transmitted over the AC-link bus, which where not previously achievable using the industry-defined AC-link protocol.

36 Claims, 9 Drawing Sheets

SYSTEM AND METHOD FOR PERFORMING DIGITAL SUBSCRIBER LINE (DSL) MODEM COMMUNICATION OVER AN AC LINK BUS

BACKGROUND OF THE INVENTION

1. Field of the Invention

The present invention relates generally to the transfer of signals between an codec and a codec controller through an AC-link bus, and specifically to a system and method for reconfiguring the protocol of the AC-link bus to allow digital subscriber line (DSL) modem communication over the AC-link bus.

2. Description of Related Art

Personal computers are currently being used for a wide variety of multimedia applications, where it is now becoming desirable for personal computers (PCs) to function with high quality audio performance. Current PC audio architectures are designed to run midrange audio-performance-integrated ISA products. In order to provide PCs with high performance/high quality audio comparable to electronics devices, a new PC architecture capable of providing this performance needed to be developed. Thus, a computer industry consortium developed a new PC audio architecture, the Audio Codec '97 (AC '97), for next-generation audio-intensive PC applications, such as DVD, 3-D multiplayer games, interactive music, and up to 2 line V.90 modems. The AC '97 architecture defines a high quality audio architecture for a PC platform to support a wide range of high quality audio solutions, from a 2-channel mix of digital and analog audio inside the PC to multi-channel audio outside the PC. The AC '97 includes at least one codec and codec controller. The codec includes two separate chips, one for primarily analog applications and one for primarily digital applications. By separating the functions performed between the analog and digital chips, individual yields can be improved which lead to overall cost reduction for the system.

The codec 10 performs digital-to-analog conversion (DAC) and analog-to-digital conversion (ADC), mixing, analog processing, and modem codec functions. The codec 10 functions as a slave to a digital codec controller 12, which, in turn, is connected to the CPU 14 of the PC, as shown in FIG. 1. The codec 10 communicates with the codec controller 12 through a digital serial link, referred to as the AC-link bus 16. The codec 10 performs the appropriate data conversion and communicates analog signals to an input/output device 18. The AC-link bus 16 was designed to directly connect the codec 10 to the codec controller 12. In prior PC architectures, it was necessary to connect an interface device between a codec 10 and the core logic controlling the codec 10. The AC '97 eliminates the need for a separate interface device to be incorporated by utilizing the AC-link bus to directly connect the codec 10 to the codec controller 12.

The AC-link bus 16 is a bi-directional, 5-wire, serial time-division multiplexed (TDM) interface designed for a dedicated point-to-point interconnect, as illustrated in FIG. 2. All digital audio streams, modem line Codec streams, and command/status information are communicated over the AC-link bus in data packets. The AC-link bus architecture has a defined protocol which divides each data packet into 12 outgoing and 12 incoming data streams, each with 20-bit sample resolution. Each of the data streams are positioned in a respective one of the 12 TDM slots in the data packet, as shown in FIG. 3. The output data streams correspond to the multiplexed bundles of all digital output data targeting AC '97's DAC inputs and control registers. The AC-link bus protocol is set forth in the *Audio Codec '97 Component Specification,* Revision 1.03, released Sept. 15, 1996 by the Audio Codec '97 Working Group, *Audio Codec '97,* Revision 2.0, released Sep. 29, 1997 by Intel Corporation, and *Audio Codec '97,* Revision 2.1, released May 22, 1998 by Intel Corporation. The disclosures of Revisions 1.03, 2.0, and 2.1 of the Audio Codec '97 are hereby incorporated by reference into this disclosure.

The industry consortium developing the AC '97 architecture wanted to promote interoperability between codecs 10 and codec controllers 12 produced by different vendors to function according to AC-link protocol. Thus, strict adherence to the specified audio input and output frame slot definitions, AC-link bus protocol, and electrical timings are required for interoperability to be maintained between various codecs 10 and codec controllers 12. The AC-link bus 16 basically performs one function, it transmits the data streams in the data packets defined by the AC-link protocol between the codec controller 12 and the codec 10, so that the AC-link bus 16 merely provides a direct data link between the codec 10 and the codec controller 12.

The codec 10 may be connected to a plurality of possible input/output devices 18, including a telephone line to communicate modem data. Modems are utilized to perform data transmissions between devices attached to the telephone line. There has recently been a growth in need for high-speed data-transmission technologies, where digital subscriber line (DSL) modem technology has been developed to deliver high bandwidth transmissions over conventional copper telephone wiring at limited distances. DSL technology utilizes a pair of devices having matched circuitry components connected through a telephone line, with one DSL modem located at the telephone company central office and the other DSL modem located at a customer's local site. The special matched circuitry provided in the DSL modems allows high-speed transmissions to occur between the two modems over a telephone line. Various types of DSL technology transmissions have been developed, including asymmetric DSL (ADSL), high-data-rate DSL (HDSL), single-line DSL (SDSL), and very-high-data-rate DSL (VDSL). The various DSL technologies are capable of transmissions at rates from 1.5 Mbit/s and up.

A problem existing with the protocol for the AC-link bus 16 is that this protocol is not designed to handle such high bandwidth DSL transmissions over an AC-link bus 16. The AC-link bus protocol provides for one of the 12 defined TDM slots in the data packet to contain a data stream for each communication line, where up to two communication lines can be supported by the AC-link bus protocol. In the industry-defined AC-link bus protocol data packet shown in FIG. 3, slot number 5 is assigned to handle respective data streams for a modem connected to a first communication line in both the incoming and outgoing data packets while slot number 10 is assigned to handle respective data streams for a modem connected to a second communication line. Presently, most personal computers are equipped with modems capable of data transmissions at rates no faster than V.90 protocol, i.e., up to 56 Kbit/s. While the bandwidth capabilities of a single TDM slot in the AC-link bus data packet is capable of handling such 56 Kbit/s data rates, the AC-link bus protocol does not allow high bandwidth DSL transmissions of 1.5 Mbit/s or greater to occur over the AC-link bus. DSL transmissions are not supported by the AC-link bus protocol, since the designated modem TDM data slot in the AC-link bus data packet is not capable of handling the high bandwidth requirements of a DSL transmission.

There is clearly a need for a system and method for performing a DSL technology modem transmission over an AC-link bus. Moreover, there is a need for a system and method for redefining the AC-link bus protocol in order to allow a high bandwidth DSL technology modem transmission to be performed over an AC-link bus.

SUMMARY OF THE INVENTION

It is a primary object of the present invention to overcome the aforementioned shortcomings associated with the prior art.

The present invention provides a system and method for system and method for performing a DSL technology modem transmission over an AC-link bus.

The system and method for performing a DSL transmission over an AC-link bus redefines the protocol of the AC-link bus in order to allow a high bandwidth DSL transmission to be performed using the data streams in a data packet transmitted between a codec and a codec controller over the AC-link bus. The codec and codec controller connected to the AC-link bus are configured for a particular AC-link bus protocol defining a data packet having multiple time-division multiplexed (TDM) data slots, so that these devices recognize which type of data stream appears in the separate TDM data slots of a data packet communicated over the AC-link bus. Currently, the AC-link bus protocol defines twelve (12) TDM data slots, where each data slot is assigned a respective data stream accomplishing a particular function. The AC-link bus protocol only provides one of the data slots for handling a modem data stream for each communication line.

The present invention redefines the AC-link bus protocol to provide at least one additional data slot for handling modem data stream transmissions. The additional data slot provides additional bandwidth capabilities which allows high-bandwidth DSL modem transmissions to be sent in the data packets transmitted over the AC-link bus. The additional TDM data slots in the data packet redefined for a DSL modem transmission may be provided in a number of ways. The system may monitor the data packet to determine whether any of the TDM data slots are not being used, where the system redefines the unused data slots to communicate DSL transmission data. Alternatively, the system of the present invention may compress and combine multiple TDM data slots into a single data slot in order to make additional data slots available for DSL transmission data. It is also possible to simply eliminate data streams in a certain TDM data slot and replace the data stream with DSL transmission data.

For high bandwidth DSL transmissions, an alternative embodiment of the system of the present invention utilizes an AC-link bus having a redefined protocol in conjunction with a USB bus to provide additional bandwidth capabilities for the DSL modem transmission. In still another alternative embodiment, undefined sideband signals for an Audio/Modem Riser (AMR) can be used in conjunction with the redefined protocol for the AC-link bus to provide the additional bandwidth capabilities necessary for high data-rate DSL modem transmissions.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for performing signal processing on data streams transmitted over an AC-link bus.

Referring back to FIG. 3, the slot assignments for the data streams comprising each incoming and outgoing TDM data packet transmitted across the AC-link bus according to the industry-defined AC-link protocol are illustrated. The AC-link bus protocol defines twelve (12) TDM data slots, where each data slot is assigned a respective data stream corresponding to a particular function. The codec and codec controller connected to the AC-link bus are configured for this AC-link bus protocol, so that these devices recognize which type of data stream appears in a particular TDM data slot. The codec then performs any necessary data conversion and transmits the data appearing in a particular TDM slot to its associated input/output device. For instance, slot 5 on both the incoming and outgoing data packets contain data streams to be transmitted over communication line 1, so that communication line 1 would communicate data across the AC-link bus through slot 5 in the data packet.

Figure 1:
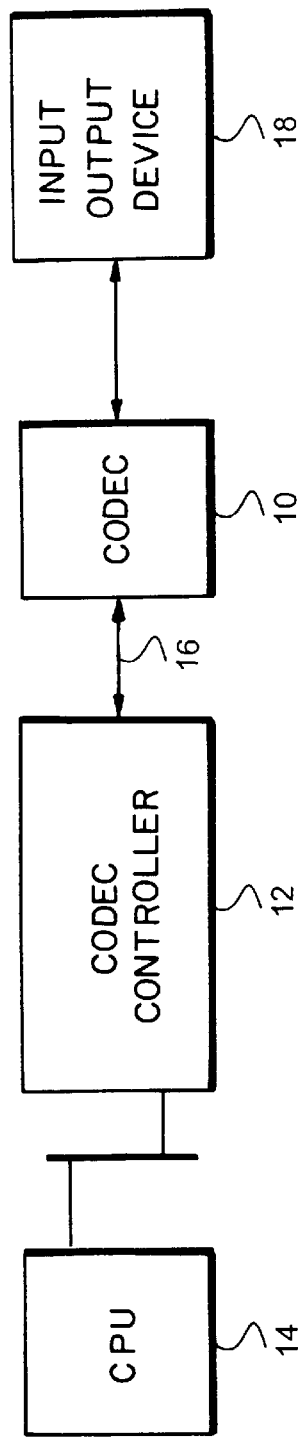
FIG. 1 is a schematic block diagram of an Audio Codec '97 computer architecture.
Figure 2:
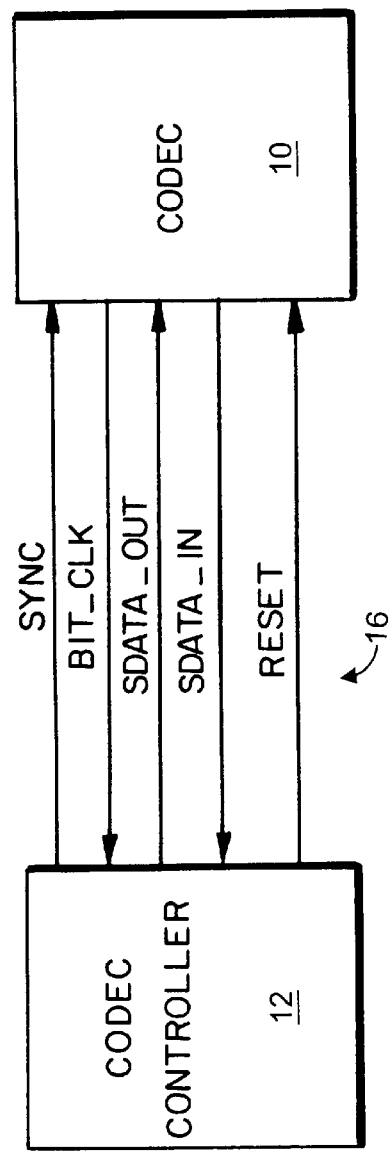
FIG. 2 is a schematic block diagram of the AC-link bus connection between the codec and companion controller of the Audio Codec '97 architecture of FIG. 1.
Figure 3:
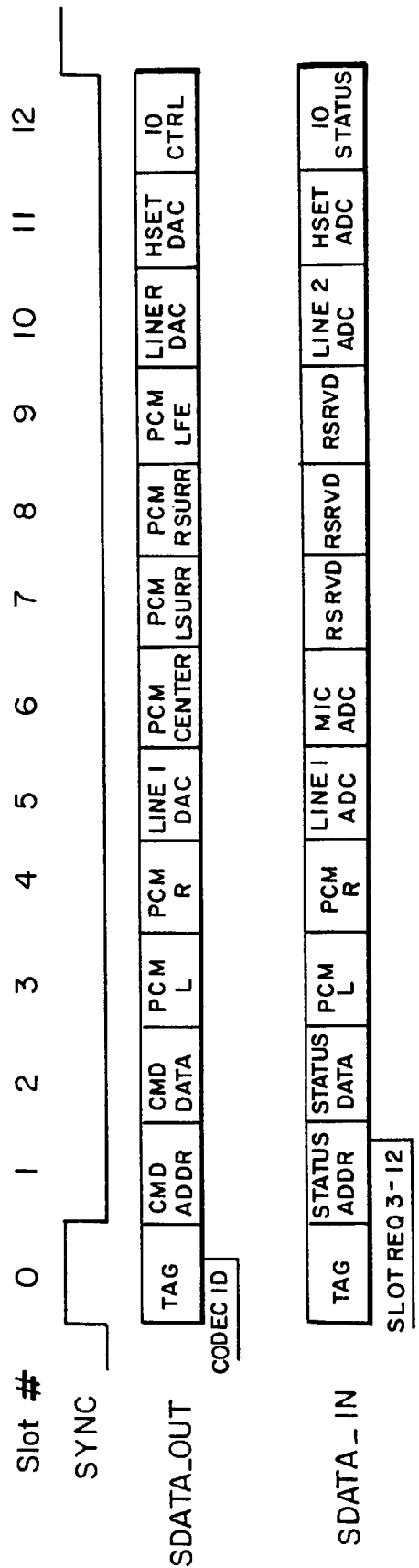
FIG. 3 shows the time-division multiplexed (TDM) slot assignment protocol for the input and output data packets transmitted across the AC-link bus of FIG. 2.
Figure 4:
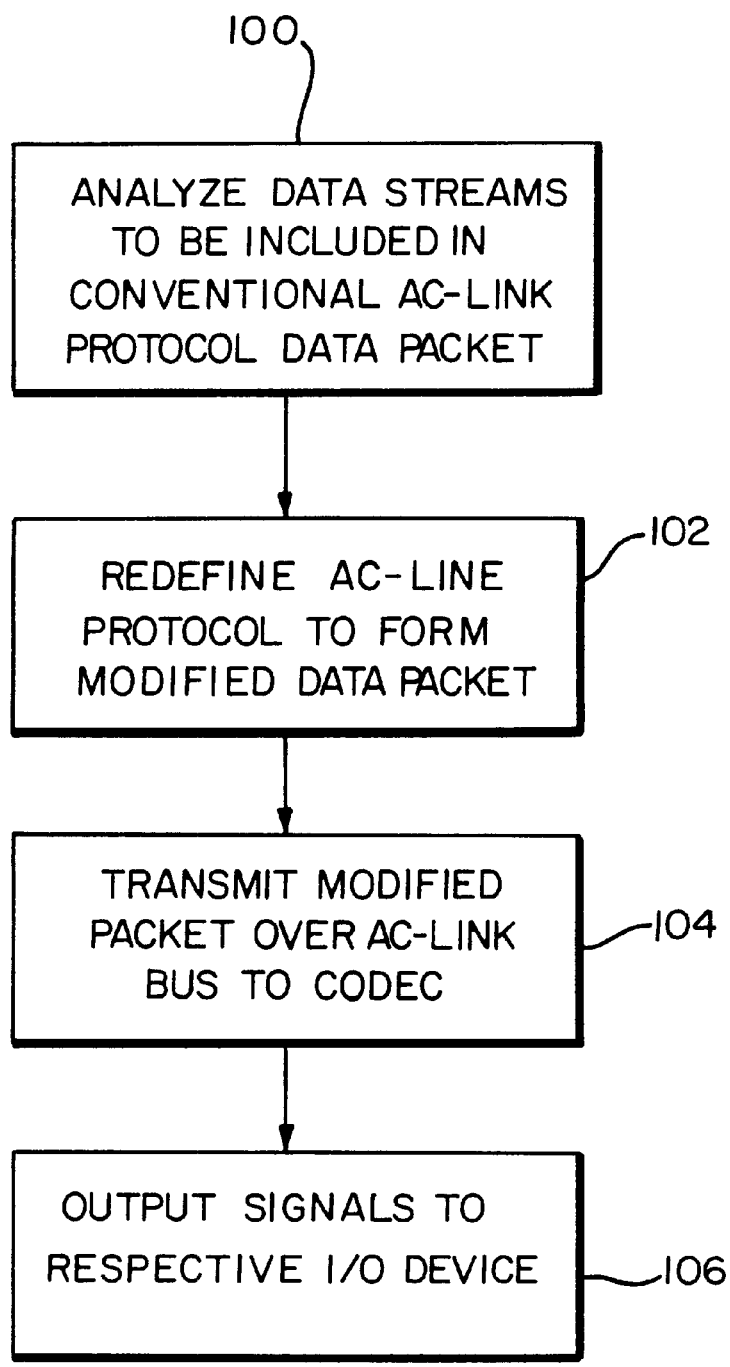
FIG. 4 is an operational block diagram of a preferred method of the present invention for performing a DSL technology modem transmission over an AC-link bus.

Referring now to FIG. 4, an operational block diagram of the method for performing a DSL technology modem transmission over an AC-link bus is illustrated. Initially in step 100, the data streams to be placed in the various TDM slots of a data packet in accordance with the AC-link bus protocol shown in FIG. 3 are analyzed. The data packet may either be an outgoing data packet prepared by the codec controller or an incoming data packet prepared by the codec. Various aspects of the data packet may be analyzed, such as which data slots in the AC-link bus protocol data packet contain no data streams or the amount of data to be transmitted in each of the TDM slots of the data packet. Rather than form the data packet according to the conventional AC-link bus protocol, the present invention redefines the bus protocol in step 102 in order to provide at least one additional TDM slot for containing data streams for a DSL modem transmission. The modified data packet may be created according to a predetermined protocol, where certain TDM slots are either eliminated or combined together in order to make an additional TDM slot available for DSL modem transmission data.

Alternatively, the modified data packet may be created according to the results of the analysis performed on the various data streams in step 100. For instance, a TDM data slot which does not contain a data stream during a particular transmission may be selected as the additional data slot to include DSL modem transmission data. Further, the analysis may determine which slots contain data streams having the least amount of information, where these slots are then chosen to be compressed, if needed, and combined in order to free up an additional slot for the DSL modem transmission data. The number of additional slots needed to be provided may be varied for the bandwidth requirements of each particular type of DSL transmission.

The data packet is modified according to the redefined bus protocol into a modified packet. The modified packet is then transmitted over the AC-link bus in step 104 to the codec. The codec then performs the necessary data conversion and outputs a signal to an input/output device corresponding to its respective data stream in step 106. For DSL modem transmissions, data streams are output from their respective redefined TDM data slots onto either communication line 1 or communication line 2. Thus, the method of the present invention allows high bandwidth DSL transmissions to be communicated over an AC-link bus.

Figure 5:
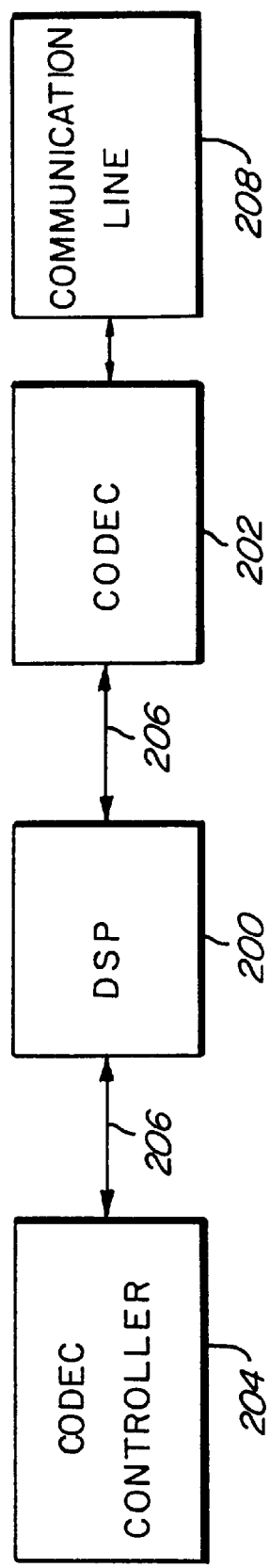
FIG. 5 is a schematic block diagram of a preferred embodiment of the system for performing signal processing on an AC-link bus of the present invention.

In an alternative embodiment of the present invention, the modified data packet is sent through a data pump or digital signal processor (DSP) 200 prior to entering the codec 202, as illustrated in FIG. 5 in block schematic form. The DSP 200 is connected to receive signals transmitted between the codec 202 and the codec controller 204. The DSP 200 may include the matched circuitry necessary for performing the DSL modem communication with a central office. Codec 202 may comprise any analog front end, where the codec 202 and codec controller 204 operate using a digital TDM data packet protocol similar to the AC-link bus protocol shown in FIG. 3. The modified protocol for the AC-link bus is formed to be compatible with components configured for the AC-link bus protocol, so that any codec or codec controller compatible with the AC-link bus protocol may be interchangeably utilized with the components of the present invention. While the present invention is specifically described as solving limitations presented by the AC-link bus protocol of the Audio Codec '97, it is understood that the present invention may also be applied to any TDM digital serial link bus directly connecting a codec to its respective codec controller.

The DSP 200 may be connected between the codec 202 and codec controller 204 in any number of manners. For instance, the DSP 200 may be directly connected to both codec 202 and codec controller 204. Alternatively, the DSP 200 may be connected to the AC-link bus 206 so that at least a portion of the signals traveling through the AC-link bus 206 are branched off into the DSP 200 for signal processing and then fed to a codec 202. In another preferred embodiment of the present invention, the DSP 200 may be connected directly in the point-to-point communication path of the AC-link bus 206, as shown in FIG. 5. In this embodiment, all of the signals transmitted over the AC-link bus 206 are passed through the DSP 200 and then back onto the AC-link bus 206 where they are transmitted to codec 202. Codec 202 is connected to communicate data signals to a respective input/output device 208.

Figure 6:
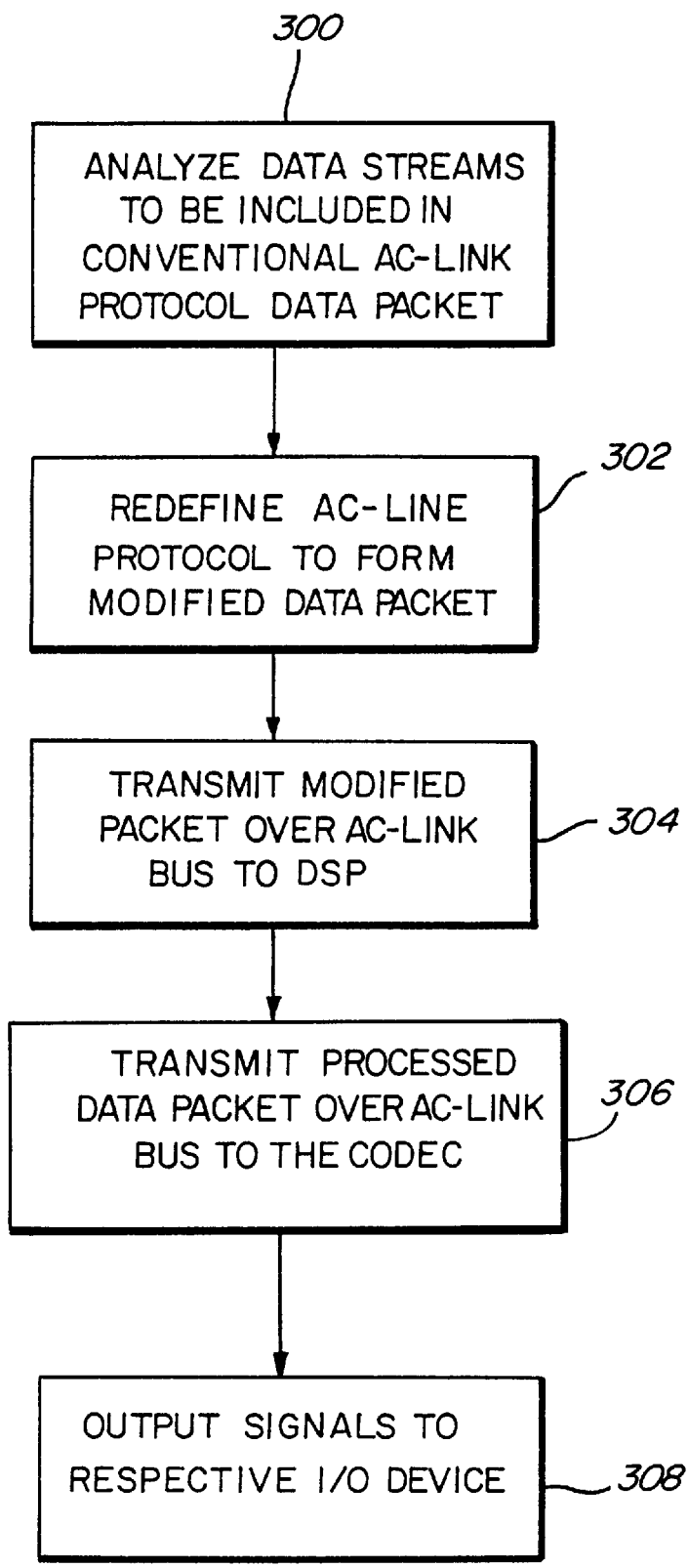
FIG. 6 is an operational block diagram of a preferred method of the present invention for performing signal processing on an AC-link bus.

The operation of the embodiment shown in FIG. 5 is illustrated in the operational block diagram of FIG. 6. In steps 300 and 302, the AC-link bus protocol is redefined and the modified data packet is formed in the same manner as described above in connection with steps 100 and 102 of the method of FIG. 4. In step 304, the modified data packet is sent over the AC-link bus 206 to the DSP 200 where the signal processing is performed on desired data streams in the modified data packet. After processing the desired data streams in the modified packet, the DSP 200 transmits the processed data packet back onto the AC-link bus 206 in step 306 for transmission to the codec 202. The codec 202 then performs the necessary data conversion and outputs data signals to the respective input/output devices 208 in step 308.

In all of the possible embodiments of the system for performing DSL modem communication over an AC-link bus 206 of the present invention, either the entire data packet to be transmitted between the codec 202 and the codec controller 204 may be passed through the DSP 200, or only selected data streams from their TDM data slots may be passed through the DSP 200. By providing the DSP 200 between the codec 202 and codec controller 204, the DSP 200 has real-time access to the data packets communicated over the AC-link bus 206. This allows certain signal processing functions to be performed more efficiently and with an improved quality over previous architectures which required the use of the codec controller 204 and host CPU to accomplish such signal processing The DSP 200 can perform any type of digital signal processing function, such as mixing, compression, decompression, filtering, audio effects, synthesis, speech recognition, delay lines, or any other signal processing. The DSP 200 can either be configured to perform a specific type of signal processing or, alternatively, can be formed to be reconfigurable, such as by specific application programs downloaded onto the personal computer. Furthermore, the DSP 200 can communicate directly with either the codec 202 or codec controller 204, so that signals can be communicated directly between one of these devices and the DSP 200.

Figure 8:
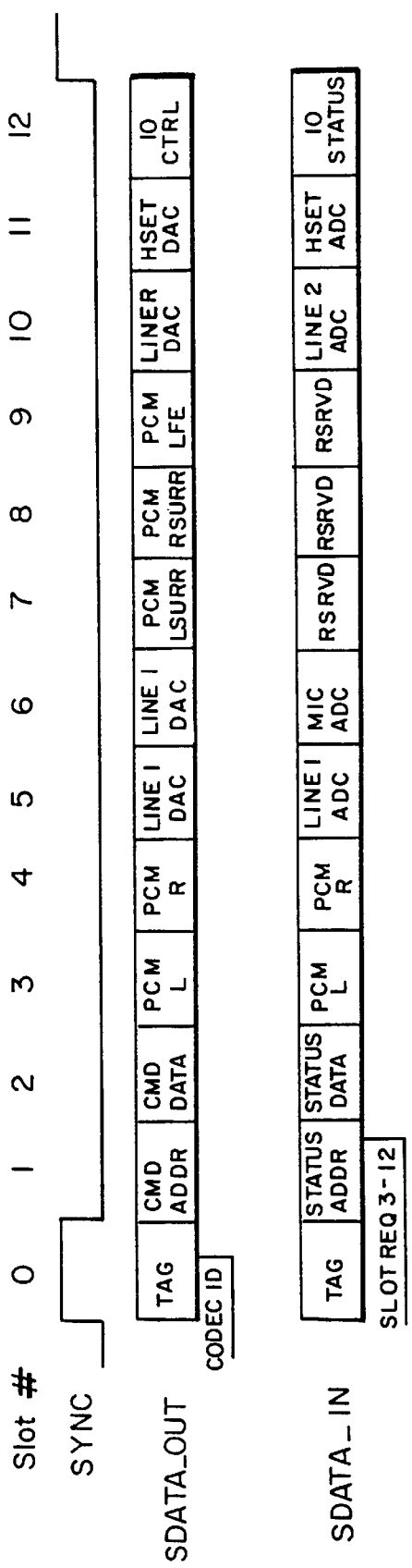
FIG. 8 shows an example of the time-division multiplexed (TDM) slot assignment protocol for a modified output data packet which has been redefined to replace the data in slot 6 with DSL modem transmission data.

The AC-link bus protocol may be reconfigured in any manner to allow DSL modem communication over the AC-link bus 206. It is possible to eliminate data streams from certain TDM slots and replace the eliminated data streams with DSL data streams. For instance, in order to borrow the TDM slot containing PCM center speaker data for a particular DSL modem transmission, TDM slot 6 may be reconfigured to contain a DSL modem data stream. The PCM center speaker data stream would then be replaced by the DSL modem transmission data stream, and the AC-link bus protocol would appear as shown in FIG. 8. Adjacent TDM slots 5 and 6 would contain DSL modem transmission data streams to be transmitted over communication line 1. By providing additional TDM slots in a AC-link bus protocol data packet, the data packet would possess an expanded capacity for a high-bandwidth DSL modem transmission of at least 1.5 Mbit/s.

Figure 9:
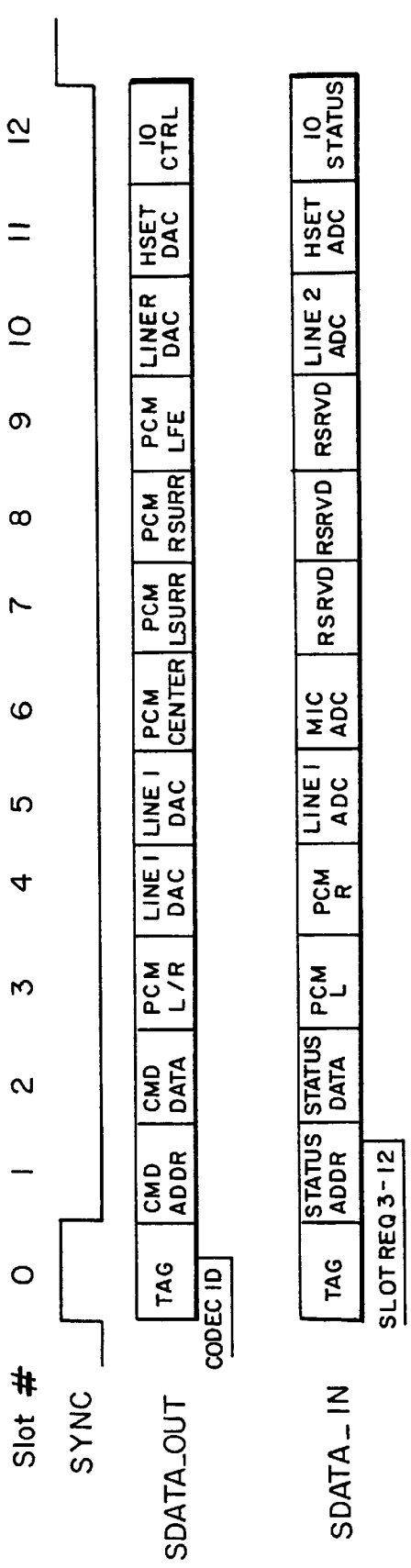
FIG. 9 shows an example of the time-division multiplexed (TDM) slot assignment protocol for a modified output data packet which has been redefined to combine the data from slots 3 and 4 into slot 3 and place DSL modem transmission data into slot 4.

Rather than eliminating the data streams from one of the TDM slots or utilizing unused TDM slots to provide additional TDM slots for the DSL transmission data, data streams from multiple TDM slots could be combined into a single TDM slot in order to make an additional TDM slot available for DSL modem data streams. For instance, the AC-link bus protocol could be redefined to compress the left and right speaker data streams respectively appearing in slots 3 and 4 as necessary and combine the compressed data streams into TDM slot 3, as shown in FIG. 9. This would make TDM slot 4 available for DSL modem data streams. Thus, the combined capacity of slots 4 and 5 would be sufficient to handle most DSL modem transmissions.

It is understood that the above-described examples are merely described for the purpose of illustrating possible ways in which the system and method of the present invention can redefine the AC-link bus protocol to allow DSL modem transmissions to occur over an AC-link bus. These examples are not intended to and do not encompass all possible manners in which the AC-link bus protocol can be redefined.

Figure 7:
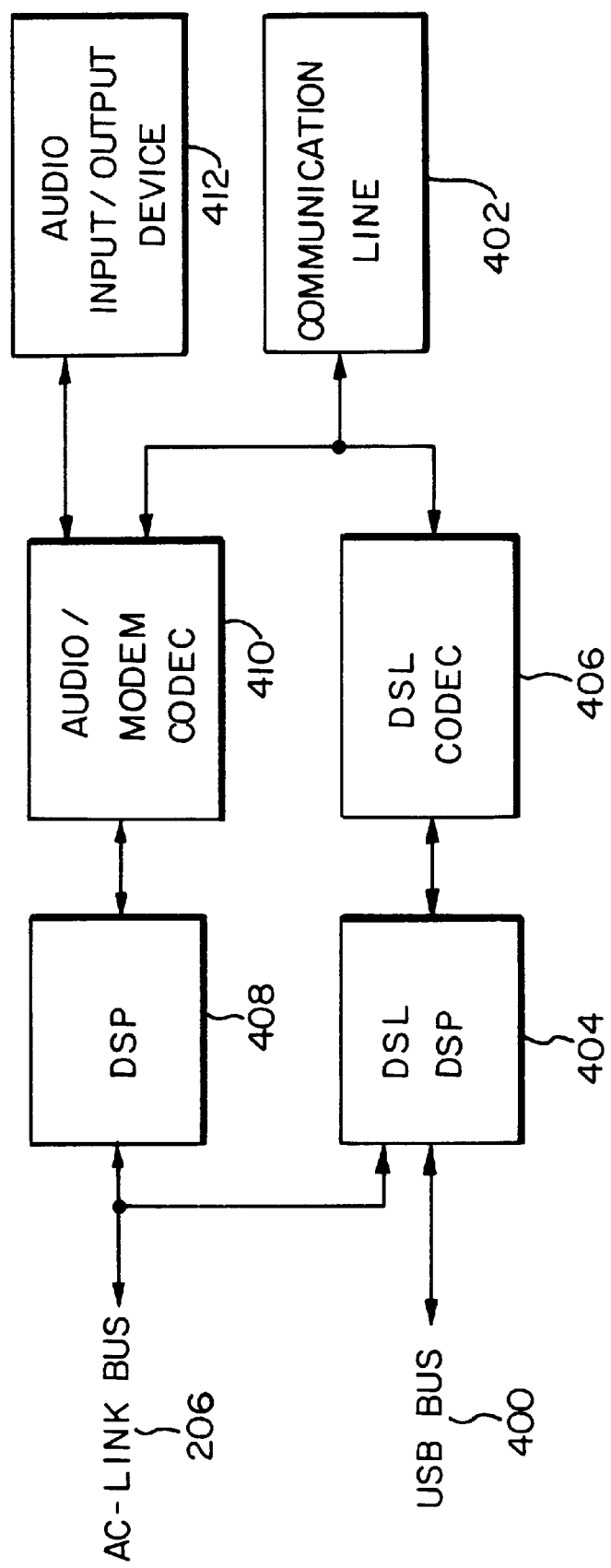
FIG. 7 is a schematic block diagram of another preferred embodiment of the system for performing a DSL technology modem transmission over an AC-link bus in conjunction with a USB bus modem transmission.

Referring now to FIG. 7, an alternative embodiment of the present invention is illustrated in block schematic form where the AC-link bus 206 is formed in combination with a USB bus 400. The protocol of the AC-link bus can be modified in accordance with the above-described invention to allow DSL modem communication over the AC-link bus 206. DSL transmissions do not require the entire bandwidth of a communication line, such as a telephone line or other similar type of communication line. Thus, other transmissions could occur over the telephone line concurrently with a DSL transmission. The USB bus 400 could be connected to provide additional bandwidth capacity for the DSL modem transmission or to transmit other non-DSL modem communications over the telephone line 402. For instance, the USB bus 400 could be connected to transmit DSL modem data, while the AC-link bus 206 is connected to communicate audio data or a modem transmission according to V.90 protocol. In this manner, voice information could be transmitted over the AC-link bus 206 in conjunction with a DSL modem data transmitted over the USB bus 400.

The USB bus 400 is connected to a DSP 404 configured for DSL transmission, wherein the DSP converts the data transmitted over the USB bus into DSL modem data. A DSL modem codec 406 is connected to the DSP 404 for communicating the DSL modem data over a communication line connected to the codec 406. The AC-link bus 206 is connected to a DSP 408 configured for processing audio data and non-DSL modem data. An audio/modem codec 410 is connected to the DSP 408 for communicating corresponding data streams from the DSP 408 to either an associated audio input/output device 412 or to a communication line 402. The AC-link bus 206 is further connected to the DSL DSP 404, so that data transmitted over the AC-link bus can also be converted into DSL modem data by DSL DSP 404. This enables the AC-link bus 206 and USB bus 400 to be used in conjunction to convey DSL modem data. For instance, the AC-link protocol may be reconfigured so that five of the b 12TDM data slots in each data packet transmitted over the AC-link bus contain DSL modem data. These five data slots may not provide enough bandwidth for the particular DSL modem transmission, so that additional data can be transmitted across the USB bus 400 to provide additional bandwidth for the DSL modem transmission. For very high bit-rate DSL modem transmissions, it may be necessary to use both the AC-link bus 206 and the USB bus 400 to provide the necessary bandwidth the high speed transmission.

Figure 10:
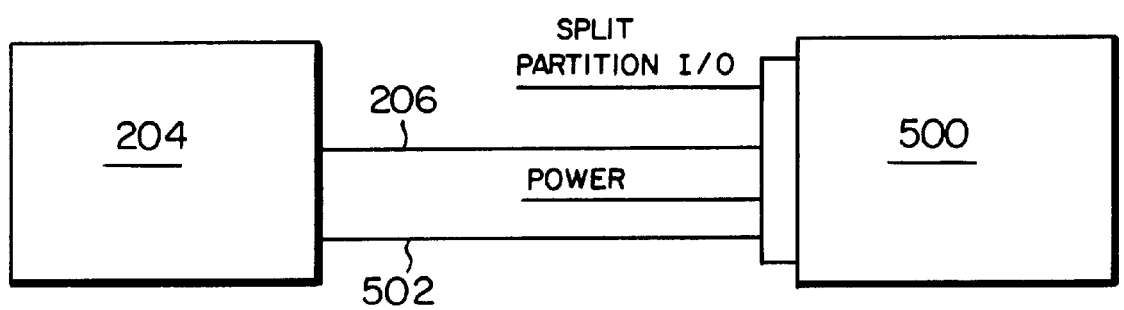
FIG. 10 is a schematic block diagram of the connections between a codec controller and a codec on a Audio/Modem Riser module.

In another alternative embodiment of the present invention, the AC-link bus 206 is used to connect a codec controller 204 to an Audio/Modem Riser (AMR) 500, as illustrated in block schematic form in FIG. 10. The AMR 500 is a hardware scalable motherboard riser board and interface defined by an industry standard specification, which supports both audio and modem transmissions. The AMR 500 can support multiple audio and/or modem codecs. The AMR specification is set forth in the *Audio/Modem Riser Specification,* Revision 1.0, released Jun. 30, 1998 by Intel Corporation. The disclosure of Revision 1.0 of the AMR Specification is hereby incorporated by reference into this disclosure. The AMR 500 is connected to codec controller 204 via the AC-link bus 206. The AMR 500 further includes a reserved connection line 502 for transmitting and receiving undefined sideband signals. The reserved connection line 502 may be used in conjunction with the AC-link bus 206 to provide additional bandwidth capabilities for a high data-rate DSL modem transmission communicated between the codec controller 204 and a modem codec of the AMR 500.

The AC-link bus 206 protocol may be redefined using special software, firmware, or a hardware state machine developed to implement the present invention. When using software, software drivers may be installed on the PC connected to the AC-link bus 108 in order to implement the software, where these software drivers will replace the existing AC-link bus 108 protocol with the redefined protocol. This specially software or hardware provides the redefined protocol necessary to allow the desired data streams to be sent to the DSP 102 for digital signal processing to be performed.

As can be seen from the foregoing, a system and method for performing DSL modem communication over an AC-link bus formed in accordance with the present invention allows high-bandwidth DSL modem data streams to be communicated over an AC-link bus. Moreover, by forming a system and method for performing DSL modem communication over an AC-link bus in accordance with the present invention, the protocol of the AC-link bus can be redefined in a variety of possible manners to form a modified data packet capable of handling DSL modem transmissions. Furthermore, by forming a system and method for performing DSL modem communication over an AC-link bus in accordance with the present invention, the data streams communicated between a codec controller and a codec can be flexibly and efficiently digitally signal processed.

In each of the above embodiments, the structures of the system and method for performing DSL modem communication over an AC-link bus of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. For instance, the present invention may be readily applied to variations of the TDM data packet protocol described above. Therefore, it is to be understood that, within the scope of the appended claims, the invention may be practiced other than as specifically described herein.

What is claimed is:

1. A method of transmitting a high-bandwidth data stream over an AC-link bus directly connecting a codec to a codec controller, wherein the codec and codec controller are configured to communicate packets of digital data streams according to a predetermined communication protocol, comprising the steps of:

analyzing the data streams to be included in a digital data packet formed according to the predetermined communication protocol;

redefining the communication protocol to provide additional bandwidth within the digital data packet for the high-bandwidth data stream;

forming a modified digital data packet according to the redefined communication protocol; and transmitting the modified digital data packet over the AC-link bus.

2. The method of claim 1, wherein the high bandwidth data stream is a digital subscriber line (DSL) modem data stream.

3. The method of claim 2, wherein the digital data packet defined by the predetermined communication protocol for the AC-link bus includes a plurality of time-division multiplexed data slots, each of the data slots assigned to contain a respective type of data with one of the slots being defined by the predetermined communication protocol to contain a data stream for a modem transmission, further wherein the redefined communication protocol redefines at least one of the time-division multiplexed data slots to provide multiple slots for containing the DSL modem data stream.

4. The method of claim 3, wherein the data stream analyzing step further determines which data slots of the data packet defined by the predetermined communication protocol do not contain data for a particular transmission, wherein a data slot not containing data during a particular transmission is redefined in the modified packet in order to provide an additional data slot in the transmitted data packet for the DSL modem data stream.

5. The method of claim 3, wherein the data stream analyzing step further determines which data slots of the data packet defined by the predetermined communication protocol contain data that can be replaced by other data during a particular transmission, wherein the data slots containing replaceable data are redefined in the modified packet in order to provide an additional data slot in the transmitted data packet for the DSL modem data stream.

6. The method of claim 3, wherein the data stream analyzing step further determines which data slots of the data packet defined by the predetermined communication protocol contain data that can combined into a single data slot during a particular transmission, wherein the data slots containing combinable data are redefined in the modified packet to combine the combinable data into a single data slot in order to provide an additional data slot in the transmitted data packet for the DSL modem data stream.

7. The method of claim 1, wherein the digital data packet defined by the predetermined communication protocol for the AC-link bus includes a plurality of time-division multiplexed data slots, each of the data slots assigned to contain a respective type of data by the predetermined communication protocol, further wherein the redefined communication protocol redefines at least one of the time-division multiplexed data slots to contain at least a portion of the high bandwidth data stream.

8. The method of claim 2, wherein the codec is connected to a communication line, the method further comprising the step of:

connecting a USB bus to the communication line to communicate DSL modem data over the communication line in conjunction with the DSL modem data communicated over the AC-link bus.

9. The method of claim 8, wherein the USB bus provides additional bandwidth for the DSL modem data stream.

10. A method of transmitting a digital subscriber line (DSL) modem data stream over an AC-link bus directly connecting a codec to a codec controller, wherein the codec and codec controller are configured to communicate packets of digital data streams according to a predetermined communication protocol, and wherein the codec is positioned on an Audio/Modem Riser device having a reserved connection line which provides an additional connection between the codec and the codec controller, the method comprising the steps of:

analyzing the data stream to be included in a digital data packet formed according to the predetermined communication protocol;

redefining the communication protocol to provide additional bandwidth within the digital data packet for the DSL modem data stream;

forming a modified digital data packet according to the redefined communication protocol, wherein only a portion of the DSL modem data stream is included within the modified digital data packet;

transmitting the modified digital data packet over the AC-link bus; and transmitting the remaining portion of the DSL modem data stream over the reserved connection line, wherein the reserved connection line provides additional bandwidth for the DSL modem data stream.

11. The method of claim 1, further comprising the steps of:

connecting a signal processing device to the AC-link bus at a point between the codec and the codec controller; and transmitting the modified digital data packet through the signal processing device for digital signal processing to be performed.

12. The method of claim 11, where the signal processing device is a data pump.

13. A system for performing a high bandwidth data transmission over an AC-link bus designed to directly link a codec to a codec controller, comprising:

a codec connected to communicate signals with an input/output device;

a codec controller for controlling the operation of the codec;

an AC-link bus connected to provide a communication path for data signals transmitted between the codec and the codec controller, wherein the codec and codec controller are configured to communicate signals in data packets according to a predetermined communication protocol; and reconfiguration means for redefining the predetermined communication protocol into a modified communication protocol capable of performing the high bandwidth data stream transmission.

14. The system of claim 13, wherein the predetermined communication protocol defines each data packet to include a plurality of time-division multiplexed data slots, each of the data slots assigned to contain a respective type of data,
further wherein the modified communication protocol redefines at least one of the time-division multiplexed data slots to include a portion of the high bandwidth data transmission.

15. The system of claim 14, further comprising analyzing means for analyzing the data to be included in the data slots of the data packet defined by the predetermined communication protocol and for determining which of the data slots do not contain data for a particular transmission,
wherein the reconfiguration means redefines a data slot not containing data during a particular transmission in the modified data packet in order to provide an additional data slot in the modified data packet for the DSL modem data stream.

16. The system of claim 14, further comprising analyzing means for analyzing the data to be included in the data slots of the data packet defined by the predetermined communication protocol and for determining which of the data slots contain data that can be replaced by other data during a particular transmission,
wherein the reconfiguration means redefines the data slots containing replaceable data in the modified data packet in order to provide an additional data slot in the modified data packet for the DSL modem data stream.

17. The system of claim 14, further comprising analyzing means for analyzing the data to be included in the data slots of the data packet defined by the predetermined communication protocol and for determining which of the data slots contain data that can be combined into a single data slot during a particular transmission,
wherein the reconfiguration means redefines the data slots containing combinable data to combine the combinable data into a single data slot in the modified data packet in order to provide an additional data slot in the modified data packet for the DSL modem data stream.

18. The system of claim 13, wherein the high bandwidth data transmission is a digital subscriber line (DSL) modem data transmission.

19. The system of claim 18, wherein the input/output device connected to the codec is a communication line.

20. The system of claim 19, further comprising a USB bus connected to the communication line to communicate DSL modem data over the communication line in conjunction with the DSL modem data communicated over the AC-link bus.

21. The system of claim 20, wherein the USB bus provides additional bandwidth for the DSL modem data transmission.

22. A system for transmitting a digital subscriber line (DSL) modem data stream over an AC-link bus designed to directly link a codec to a codec controller, wherein the codec is positioned on an Audio/Modem Riser device having a reserved connection line which further connects the codec to the codec controller, the system comprising:
a codec connected to communicate signals with a communication line;
a codec controller for controlling the operation of the codec;
an AC-link bus connected to provide a communication path for data signals transmitted between the codec and the codec controller, wherein the codec and codec controller are configured to communicate signals in data packets according to a predetermined communication protocol; and
reconfiguration means for redefining the predetermined communication protocol into a modified communication protocol capable of performing the DSL modem data stream transmission, wherein only a portion of the DSL modem data stream is included within the modified data packet transmitted over the AC-link bus; and
further wherein the remaining portion of the DSL modem data stream is transmitted over the reserved connection line which provides additional bandwidth for the DSL modem data transmissions.

23. The system of claim 13, further comprising a signal processing device connected to the AC-link bus at a point between the codec and codec controller, wherein the modified data packet is transmitted through the signal processing device for digital signal processing to be performed.

24. The system of claim 23, wherein the signal processing device is a data pump.

25. A storage medium which stores a program for transmitting a high-bandwidth data stream over an AC-link bus directly connecting a codec to a codec controller, wherein the high-bandwidth data stream is communicated in a digital data packet according to a predetermined communication protocol, said program including:
an analyzing step for analyzing the data to be included in the digital data packet formed according to the predetermined communication protocol;
a protocol redefining step for redefining the communication protocol to specify at least an additional portion of the digital data packet to provide additional bandwidth for the high-bandwidth data stream; and
a packet formation step for forming a modified data packet according to the redefined communication protocol; and
a communication step for transmitting the modified digital data packet over the AC-link bus.

26. The storage medium of claim 25, wherein the high bandwidth data stream is a digital subscriber line (DSL) modem data stream.

27. The storage medium of claim 26, wherein the digital data packet defined by the predetermined communication protocol for the AC-link bus includes a plurality of time-division multiplexed data slots, each of the data slots assigned to contain a respective type of data with one of the slots being defined by the predetermined communication protocol to contain a data stream for a modem transmission,
further wherein the modified protocol redefines at least one of the time-division multiplexed data slots to provide multiple slots for containing the DSL modem data stream.

28. The storage medium of claim 27, wherein the data stream analyzing step further determines which data slots of the data packet defined by the predetermined communication protocol do not contain data during a particular transmission,
wherein a data slot not containing data during a particular transmission is redefined in the modified data packet in order to provide an additional data slot in the transmitted data packet for the DSL modem data stream.

29. The storage medium of claim 27, wherein the data stream analyzing step further determines which data slots of the data packet defined by the predetermined communication protocol contain data that can be replaced by other data during a particular transmission,
wherein the data slots containing replaceable data are redefined in the modified data packet in order to provide an additional data slot in the transmitted data packet for the DSL modem data stream.

30. The storage medium of claim 27, wherein the data stream analyzing step further determines which data slots of the data packet defined by the predetermined communication protocol contain data that can combined into a single data slot during a particular transmission, wherein the data slots containing combinable data are redefined to combine the combinable data streams into a single data slot in the modified data packet in order to provide an additional data slot in the transmitted data packet for the DSL modem data stream.

31. The storage medium of claim 25, wherein the digital data packet defined by the predetermined communication protocol includes a plurality of time-division multiplexed data slots, each of the data slots assigned to contain a respective type of data, further wherein the modified protocol redefines at least one of the time-division multiplexed data slots to contain at least a portion of the high bandwidth data stream.

32. The storage medium of claim 26, wherein the codec is connected to a communication line and a USB bus is further connected to the communication line, said program further including:

an AC-link bus communication step for communicating the DSL modem data stream contained within the modified data packet over the communication line; and a USB bus communication step for communicating data transmitted over the USB bus over the communication line in conjunction with the DSL modem data communicated over the AC-link bus.

33. The storage medium of claim 32, wherein the USB bus provides additional bandwidth for the DSL modem data stream.

34. A storage medium which stores a program for transmitting a digital subscriber line (DSL) modem data stream over an AC-link bus directly connecting a codec to a codec controller, wherein the codec is positioned on an Audio/Modem Riser device having a reserved connection line which provides an additional connection between the codec and the codec controller, and wherein the DSL modem data stream is communicated in a digital data packet according to a predetermined communication protocol, said program comprising the steps of:

analyzing the data to be included in the digital data packet formed according to the predetermined communication protocol;

redefining the communication protocol to specify at least an additional portion of the digital data packet to provide additional bandwidth for the DSL modem data stream;

forming a modified digital data packet according to the redefined communication protocol, wherein only a portion of the DSL modem data stream is included within the modified digital data packet;

transmitting the modified digital data packet over the AC-link bus; and transmitting the remaining portion of the DSL modem data stream over the reserved connection line, wherein the reserved connection line provides additional bandwidth for the DSL modem data stream.

35. The storage medium of claim 25, wherein a signal processing device is connected to the AC-link bus at a point between the codec and the codec controller; said program further including a signal processing step for transmitting the modified digital data packet through the signal processing device for digital signal processing to be performed.

36. The method of claim 35, where the signal processing device is a data pump.

* * * * *